Jan. 3, 1939.  W. F. BARCROFT  2,142,103
AUTOMOBILE RECORDING DEVICE
Filed Sept. 21, 1936
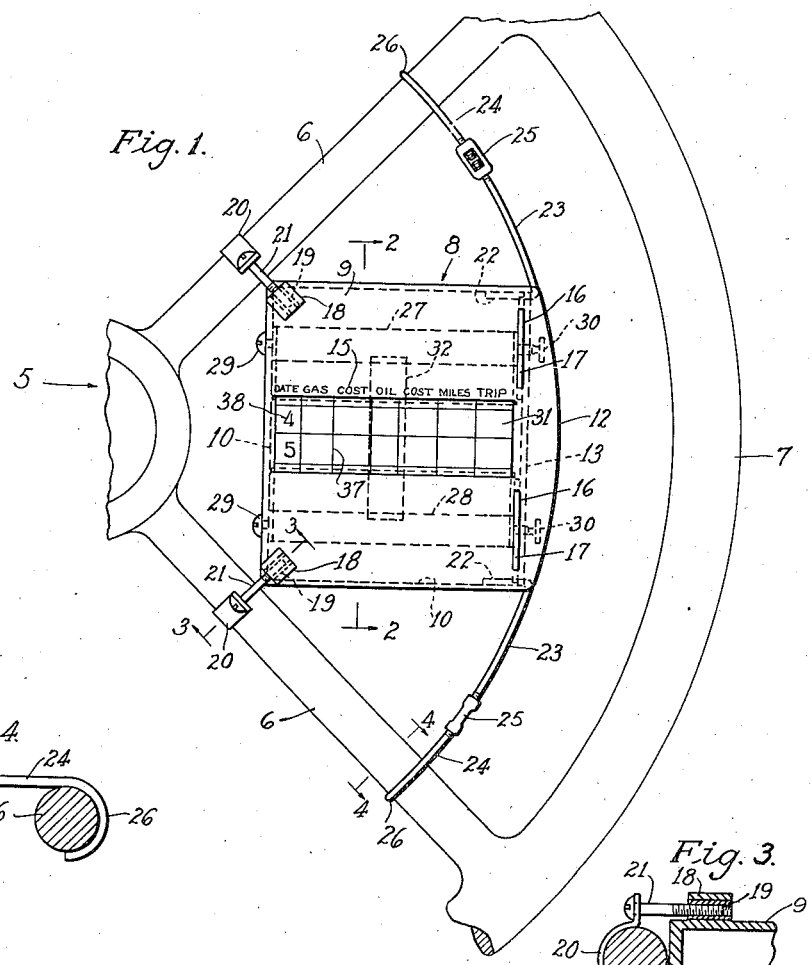
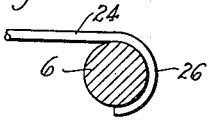
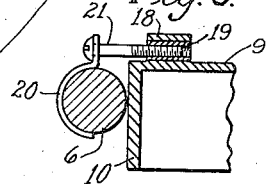
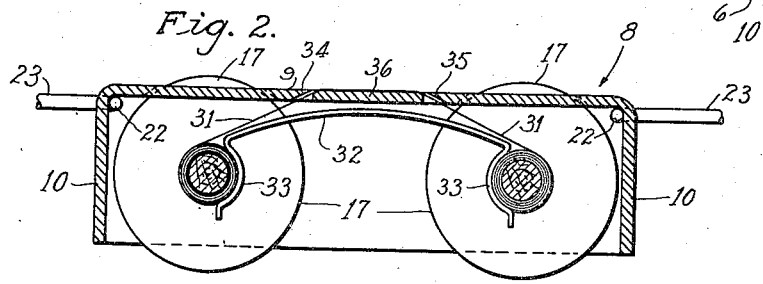
INVENTOR.
Wilbert F. Barcroft
BY Carlos G. Stratton
ATTORNEY.

Patented Jan. 3, 1939

2,142,103

UNITED STATES PATENT OFFICE 2,142,103

AUTOMOBILE RECORDING DEVICE

Wilbert F. Barcroft, Los Angeles, Calif.

Application September 21, 1936, Serial No. 101,743

4 Claims. (Cl. 281—9)

My invention relates to an automobile recording device, and more particularly to a device adapted to be attached to a convenient place on an automobile, such as the steering wheel, for recording trip information, gasoline and oil mileage, etc.

It is an object of the invention to provide such a device that may be firmly mounted between the spokes of a steering wheel without interfering with the ordinary use of the steering wheel.

The invention also comprises novel details of construction and novel combinations and arrangements of parts, which will more fully appear in the course of the following description.

In the drawing, like reference characters designate similar parts in the several views.

Figure 1 is a face view of my device as applied to the steering wheel (broken away) of an automobile.

Figure 2 is an enlarged section taken on the line 2—2 of Figure 1.

Figure 3 is an enlarged section taken on the line 3—3 of Figure 1.

Figure 4 is an enlarged section taken on the line 4—4 of Figure 1.

Referring more in detail to the drawing, the reference numeral 5 generally designates an automobile steering wheel comprising spokes 6 and a wheel 7 of any conventional construction.

My device comprises a box or housing 8 having a face plate 9 that is provided with rearwardly projecting flanges 10 at the periphery of the face plate. The face plate 9 has a curved edge 12 that overhangs rearwardly projecting flange 13 on the box. When in use, said curved edge substantially conforms with the wheel 7 in spaced relation therefrom.

The face plate 9 has parallel slots 34 and 35. Indicia 15 are disposed along an edge of the slot 34. The indicia shown in the drawing consist of a series of words, "Date Gas Cost Oil Cost Miles Trip." It is to be understood that the particular indicia may be varied to suit particular conditions and particular uses of my device. The face plate likewise has apertures 16 for thumb wheels 17, hereinafter more fully described.

Bosses 18 on the face plate contain embedded sleeve nuts 19. It is to be understood without further illustration that the contour of the bosses may be changed without departing from the spirit of the invention, such as sloping an end of the bosses down to the face plate.

Yieldable hooks 20 are arranged for gripping the spokes 6 of the steering wheel. Bolts 21 on the hooks are screwed into the nuts 19 for drawing the box 8 into tight engagement with the spokes.

The flange 13 has apertures for insertion therein of bent ends 22 of curved rod sections 23. Other curved rod sections 24 are continuous therewith. Turnbuckles 25 connect threaded abutting ends of the rod sections 23 and 24. The rod sections 24 have hooked ends 26 for engagement around the spokes 6. It will be noted from the drawing that the rod sections 23, 24 and the curved edge 12 together form a continuous arc from one spoke 6 to another, which arc is substantially parallel with the wheel 7 but spaced from the wheel, whereby the driver will not be interfered with in the steering of the automobile.

It will also be noted that the face or top of the box 8 is substantially flush with the top of the wheel 7, since the bent ends 22 are immediately under the top face plate 9 and since the bosses 18 are on top of said plate 9.

Within the box 8 are spools 27 and 28. Screws 29 and thumb screws 30 rotatably mount the spools in place. A paper tape 31 is wound upon the spools 27, 28, and a spring clamp 32 having socketed head members 33 maintains the tape around the spools.

The thumb wheels 17 are respectively mounted on the spools for manipulation of the latter. It will be noted in Figure 2 that the thumb wheels project above the face plate 9 for operative engagement.

The tape 31 preferably threads through slots 34 and 35 in the face plate 9. Portion 36 of the face plate between the slots 34, 35 provides a support and writing surface for the tape. The tape may carry columns 37 alined with the indicia respectively and may carry numbers 38 indicating the days of the month. Of course any other indicia may be employed, to fit my device, for a particular use.

In the use of my invention, after the device is fastened tightly in place by means of the screws 21 and the turnbuckles 25, it is convenient and accessible and yet not in the driver's way. Data as to trip mileage, gasoline and oil mileage, cost, and many other items of interest may be set down on the tape. A space is provided for each day, so it becomes a diary of the operation of the automobile. The tape is progressed by turning the upper thumb wheel 17 as shown in Figure 1, in a clockwise direction, and the tape is reversed by turning the lower thumb wheel in a counterclockwise direction.

When the tap has reached an end, the full spool is removed by unscrewing the screws 29, 30. The empty spool may then be moved to the place vacated by the full spool and another full spool put in the place vacated by the empty spool. A complete month to month record may thus be accurately kept.

It will be noted that the spring clamp 32 is not supported by the box, but floats therein, permitting it to move back and forth as the tape moves from one spool to another.

The application of forces upon the box 8, due to the curved rod sections, is toward the notch between the spokes 6.

It is to be understood that changes may be made in the details of the construction and arrangement of said embodiment, without departing from the spirit and scope of my invention.

Having thus described my invention, what I claim and desire to secure by Letters Patent is:

1. In a mounting for positioning a recording device between adjacent spokes of a motor vehicle steering wheel, hooks gripping each of said adjacent spokes, and turnbuckles fastening the hooks to said device, the turnbuckles drawing the device toward the adjacent spokes respectively.

2. In a mounting for positioning a recording device between adjacent spokes of a motor vehicle steering wheel, hooks gripping each of said adjacent spokes, and screw means fastening the hooks to said device, the screw means drawing the device toward the adjacent spokes respectively.

3. In a mounting for positioning a recording device between adjacent spokes of a motor vehicle steering wheel, yieldable means fastened to each of the adjacent spokes and to said device, said means being under tension and tending to draw the device in different directions toward the adjacent spokes respectively.

4. In a mounting for positioning a recording device between adjacent spokes of a motor vehicle steering wheel, rods mounted on said adjacent spokes in spaced relation to the steering wheel, to permit the ordinary use of the steering wheel, the rods being connected with the device and tending to draw same toward the spokes respectively, and means for varying the tension of the rods upon the device.

WILBERT F. BARCROFT.